(12) United States Patent
Gisler et al.

(10) Patent No.: US 7,152,712 B2
(45) Date of Patent: Dec. 26, 2006

(54) CONTROL MOMENT GYRO SPIN BEARING LUBRICANT DELIVERY SYSTEM AND METHOD

(75) Inventors: Gary L. Gisler, Glendale, AZ (US); Mark A. Heller, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 519 days.

(21) Appl. No.: 10/431,794

(22) Filed: May 7, 2003

(65) Prior Publication Data
US 2004/0222045 A1 Nov. 11, 2004

(51) Int. Cl.
*F16N 7/30* (2006.01)
(52) U.S. Cl. .......................... 184/53; 184/57
(58) Field of Classification Search .................. 184/51, 184/53, 57, 26
See application file for complete search history.

(56) References Cited
U.S. PATENT DOCUMENTS

| | | | |
|---|---|---|---|
| 3,142,182 A | * | 7/1964 | Dane, Jr. ..................... 74/5 R |
| 4,466,299 A | * | 8/1984 | Mross et al. .................. 74/5.7 |
| 4,513,704 A | * | 4/1985 | Evans ...................... 123/196 S |
| 5,598,902 A | * | 2/1997 | Lin ............................ 184/45.1 |
| 5,741,275 A | | 4/1998 | Wyssmann |
| 6,354,816 B1 | * | 3/2002 | Yang .......................... 417/411 |
| 6,408,985 B1 | | 6/2002 | Orlitzky et al. |
| 6,431,411 B1 | * | 8/2002 | Wenner ....................... 222/386 |
| 2002/0189687 A1 | | 12/2002 | Linthorst |

FOREIGN PATENT DOCUMENTS

| | | |
|---|---|---|
| DE | 29902553 U1 | 5/1999 |
| GB | 877234 A | 9/1961 |
| WO | WO99/64175 A | 12/1999 |

* cited by examiner

*Primary Examiner*—David Fenstermacher
(74) *Attorney, Agent, or Firm*—Ingrassia Fisher & Lorenz

(57) ABSTRACT

A lubrication medium supply system and method for delivering lubricant to, for example, the spin bearings of a control moment gyro (CMG), includes a reservoir, a motor, and a valve. A lubrication medium is placed within the reservoir, and the motor, which is coupled to the reservoir, compresses, and thereby pressurizes, the lubrication medium. The valve opens in response to the pressurization of the lubrication medium, to thereby dispense a predetermined amount of lubrication medium from the reservoir, while simultaneously depressurizing the lubrication medium in the reservoir.

24 Claims, 3 Drawing Sheets

CONTROL MOMENT GYRO SPIN BEARING LUBRICANT DELIVERY SYSTEM AND METHOD

FIELD OF THE INVENTION

The present invention generally relates to a lubricant delivery system and method and, more particularly, to a lubricant delivery system and method for the bearings that rotationally support a device, such as a control moment gyroscope rotor.

BACKGROUND OF THE INVENTION

Attitude control in many spacecraft is implemented using one or more control moment gyros (CMGs). A CMG is a torque-generating mechanism that may include a rotating flywheel, or rotor, that is mounted in a gimbal frame and that rotates about a spin axis. The gimbal frame may be rotationally mounted about one or more gimbal axes, which are perpendicular to the spin axis. Additionally, one or more actuators may be coupled to the gimbal frame and, in response to attitude control commands, may rotate the gimbal frame about one or more of the gimbal axes. By rotating the frame about one or more of the gimbal axes at certain rates, torques can be generated in the spacecraft body to effect spacecraft attitude control.

As was noted, one of the components of a CMG is a spinning rotor. The rotor is rotationally supported using one or more bearing assemblies. The bearing assemblies are predominantly rolling element contact bearings, which are many times the limiting factor in the life of a CMG. The bearings are supplied with an initial quantity of lubricant, such as oil, to reduce rotational friction losses and to mitigate bearing wear. Depletion of this lubricant can induce failure. To address this problem, magnetic bearings have been used in some instance, but this results in increased power demand. Another way this problem has been addressed is to provide a system to periodically replenish the lubricant. Thus, an oil delivery system is provided on many CMGs.

At least one known oil delivery system includes a pressurized oil reservoir, a solenoid valve, and an oil supply line. The pressurized oil reservoir is a compressible bellows that is filled with oil. The oil within the bellows is continuously pressurized by a spring that biases the bellows toward compression. The oil supply line is in fluid communication with the CMG bearing assemblies, and the solenoid valve is in fluid communication with the reservoir and the supply line. Thus, in order to supply oil to the CMG bearing assemblies, the solenoid valve is momentarily opened, releasing a volume of oil into, and through, the supply line and to the CMG bearing assemblies. To confirm the amount of oil released, linear potentiometers have been incorporated into the system to measure the amount of bellows travel when the solenoid valve is opened.

Although the above-described oil supply system is believed to be generally safe and reliable, under certain circumstances it may exhibit certain drawbacks. For example, because the oil reservoir is continuously pressurized, if the solenoid valve leaks or remains open for an unintended length of time, an excessive amount of oil could be supplied to the CMG bearing assemblies. In a worst-case scenario, the entire contents of the oil reservoir could be inadvertently emptied to the CMG bearing assemblies. An excessive amount of oil in the CMG bearings could result in degradation of CMG performance and possible failure. As a result, the volume of the reservoir and/or oil contained within the reservoir is restricted to an amount that will not result in degradation or failure in the unlikely event the entire reservoir is emptied to the CMG bearings. This reduces the amount of oil that can be stored in the reservoir, which can adversely affect mission lifetime.

In addition to the above, the use of a solenoid valve and potentiometers can increase system costs and complexity. Moreover, the weld process that is used to join the valve in the system, and the calibration procedures associated with system implementation can be unduly complex, time-consuming, and costly.

Accordingly, it is desirable to provide a system and method for delivering lubricant to one or more CMG spin bearings that addresses one or more of the above-noted drawbacks. Namely, a lubricant delivery system and method that reduces the likelihood of delivering excessive amounts of lubricant to the spin bearings, which can increase mission lifetime by having a larger amount of deliverable oil, and that reduces system fabrication and maintenance complexity, time, and associated costs. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A system and method for delivering lubricant to, for example, control moment gyro (CMG) spin bearings is provided that reduces the likelihood of delivering excessive amounts of lubricant to the spin bearings, and that reduces system fabrication and maintenance complexity, time, and associated costs.

In one embodiment, and by way of example only, a lubrication medium supply system includes a reservoir, a motor, and a valve. The reservoir has an inner volume adapted to receive a lubrication medium therein. The motor is coupled to the reservoir and is operable to compress, and thereby pressurize to at least a first pressure magnitude, the lubrication medium. The valve has at least a fluid inlet in fluid communication with the reservoir inner volume and a fluid outlet. The valve is operable, in response to the pressurization of the lubrication medium to at least the first pressure magnitude, to fluidly couple the fluid inlet and fluid outlet in communication with one another to thereby depressurize the pressurized lubrication medium, whereby lubrication medium flows from the reservoir through the valve body fluid outlet at least until the lubrication medium is depressurized to a second pressure magnitude.

In another exemplary embodiment, a valve includes a valve body and a flow control element. The valve body includes at least a fluid inlet and a fluid outlet. The fluid inlet is adapted to couple to a selectively pressurized source of a lubrication medium. The flow control element is disposed within the valve body and is operable, in response to pressurization of the lubrication medium to at least a first pressure magnitude, to move between at least a closed position and an open position. The fluid inlet and fluid outlet are in fluid communication with one another when the flow control element is not in the closed position.

In yet another exemplary embodiment, a method of supplying lubricant contained within a reservoir to a bearing assembly includes providing a valve having a fluid inlet in fluid communication with the lubricant in the reservoir and a fluid outlet in fluid communication with the bearing assembly. The valve is operable, in response to pressurization of the lubricant in the reservoir to at least a first pressure magnitude, to couple the fluid inlet and fluid outlet in fluid communication with one another. The lubricant is pressurized to at least the first pressure magnitude to thereby move the valve to the open position, whereby lubricant flows from the reservoir to the bearing assembly and substantially simultaneously depressurizes the lubricant.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although the present embodiment is, for convenience of explanation, depicted and described as being implemented in a control moment gyro of a satellite attitude control system, it will be appreciated that it can be implemented in other systems and environments, both terrestrial and extraterrestrial.

Figure 1:
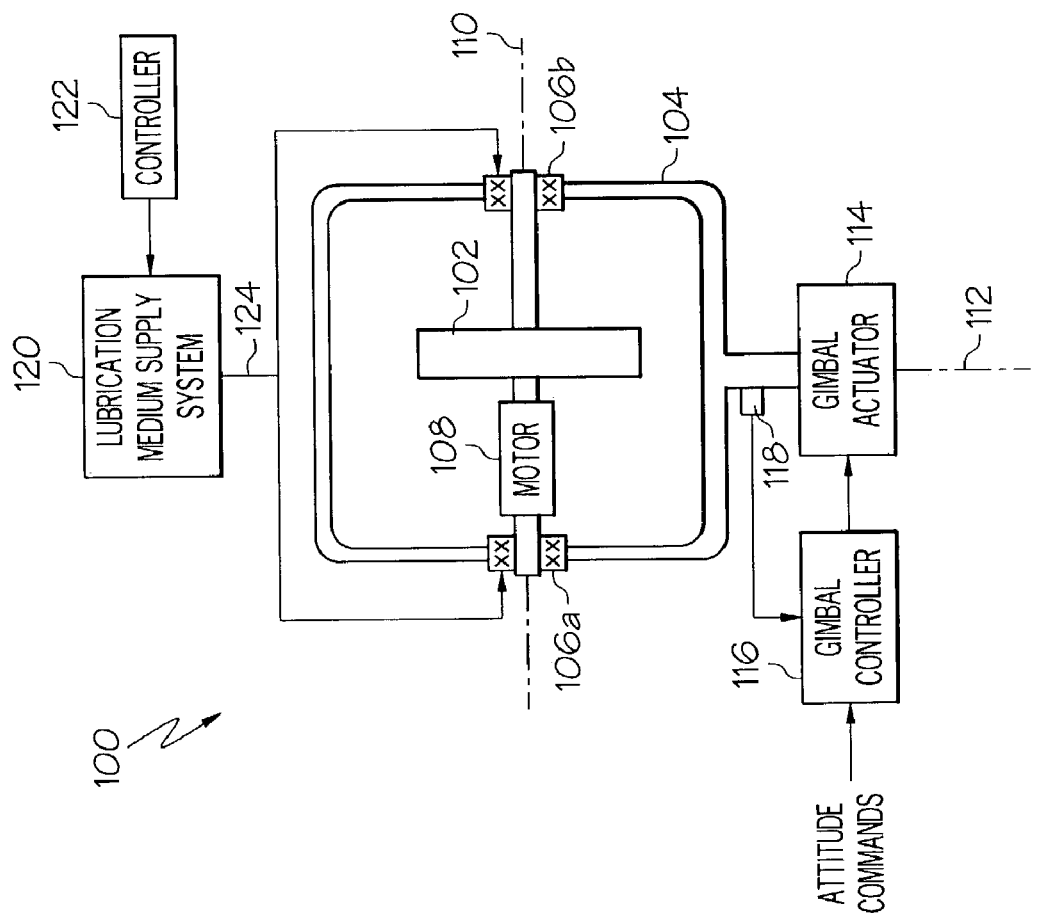
FIG. 1 is a simplified schematic diagram of an exemplary control moment gyro system.

Turning now to the description and with reference first to FIG. 1, a simplified schematic diagram of an exemplary control moment gyro (CMG) 100 is shown. The CMG 100 may be installed in a spacecraft such as, for example, a satellite, and may be used in conjunction with other CMGs 100 to control spacecraft attitude. In the depicted embodiment, the CMG 100 includes a flywheel (or rotor) 102 and a gimbal frame 104. The flywheel 102 is rotationally supported on the gimbal frame 104 via a plurality of bearing assemblies 106. In the depicted embodiment, first 106a and second 106b bearing assemblies are provided, though it will be appreciated that other numbers of bearing assemblies could be provided.

A motive power supply source 108 such as, for example, a motor, is coupled to the flywheel 102 to rotate the flywheel 102 about a spin axis 110. It will be appreciated that the motor 108 could be any one of numerous motor designs known now, or developed in the future including, but not limited to, various types of DC and AC motor designs.

The gimbal frame 104 is rotationally supported about one or more gimbal axes 112, which are perpendicular to the flywheel spin axis 110, via one or more gimbal actuators 114. The gimbal actuators 114 are coupled to receive control signals from, for example, a gimbal controller 116. As is generally known, attitude control in a spacecraft may be implemented by changing the angles of each gimbal frame 104 at certain rates (e.g., angular velocities). Thus, in response to attitude commands received from one or more other systems (not shown), the gimbal controller 116 supplies appropriate control signals to the gimbal actuators 114. In response to these control signals, the gimbal actuators 114 move the gimbal frame 104 at the appropriate angular velocities along the gimbal axes 112. One or more sensors 118 that can sense, for example, the position and rate of the gimbal frame 104, may be included to supply position and rate feedback signals to the gimbal controller 116.

Figure 2:
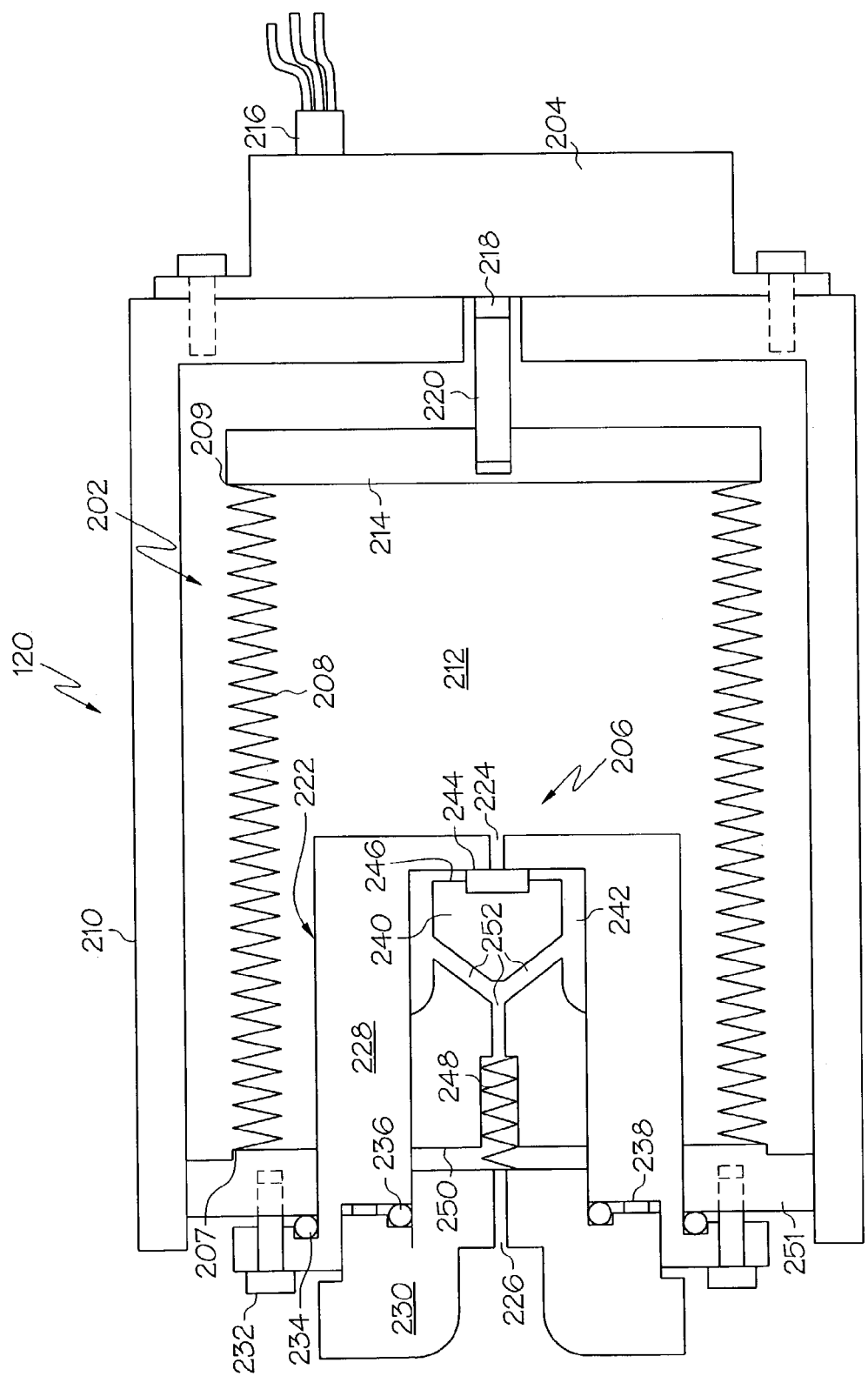
FIG. 2 is a cross section view of a lubrication medium supply system according to an exemplary embodiment of the present invention that may be incorporated into the control moment gyro system shown in FIG. 1.

In the depicted embodiment, the bearing assemblies 106 are, for example, rolling element bearing assemblies that need periodic lubrication. Thus, a lubrication medium supply system 120 is also shown in FIG. 1. The lubrication medium supply system 120 is used to selectively and/or periodically supply precise quantities of lubricant to the bearing assemblies 106. The lubrication medium supply system 120 receives commands from a controller 122 and, in response to the received commands, supplies lubrication to the bearing assemblies 106 via one or more lubrication supply lines 124. Confirmation of the quantity of lubricant delivered is derived from a determination of the amount of reservoir displacement. It will be appreciated that the controller 122 may be a specialized controller that is used solely to control the lubrication medium supply system 120, or a general controller that is used to control other systems in addition to the lubrication supply system 120. A cross section view of lubrication medium supply system 120 is shown in FIG. 2, and will now be described in detail.

The lubrication medium supply system 120 includes a reservoir 202, a motor 204, and a valve 206. The reservoir 202, in the depicted embodiment, is a flexible bellows 208 that is made of any one of numerous materials including, but not limited to, various steel alloys. In a particular preferred embodiment, however, the bellows 208 is made of AM350 steel. The bellows 208 is contained within a housing 210, and is at least partially filled with a lubrication medium 212. The lubrication medium 212 may be any one of numerous types of lubricants useful as a bearing lubricant such as, for example, Pennzane® Nye 2001 liquid lubricant. The bellows 208 is coupled at a first end 207 to the a threaded end cap 251 and at a second end 209 to an end plate 214. The bellows first 207 and second ends 209 are preferably coupled to the threaded end cap 251 and end plate 214, respectively, by, for example, a welding process, though it will be appreciated that any one of numerous other known methods of coupling could be used.

The motor 204 is coupled to an end of the housing 210, and includes an input connection 216 such as, for example, a plug connector, that is adapted to receive appropriate commands from the controller 122. As will be described in more detail below, the motor 204 will rotate in either a first direction or a second direction in response to the commands received from the controller 122. The motor 204 may be any one of numerous known motor designs known now, or developed in the future, but in a preferred embodiment, it is a stepper motor. The motor 204 also includes an output shaft 218 that is coupled to an actuator assembly 220. The actuator assembly 220 is in turn coupled to the bellows end plate 209 and, as will be also described in more detail below, is used to compress or decompress the bellows 208. To do so, the actuator assembly 220 is configured to translate linearly in either a first or a second direction, in response to the rotation of the motor 204 in the first or second direction, respectively. The actuator assembly 220 may be any one of numerous known elements that may implement this functionality such as, for example, a leadscrew, or a ballscrew. In addition, although the motor 204 is depicted as being coupled to the housing 210, it will be appreciated that it could be mounted remote from the housing 210. Determining and maintaining a count of steps or revolutions taken by the motor, and knowing the relationship between the steps or revolutions and linear translation of the actuator, provides knowledge of bellows displacement and, therefore, quantity of oil delivered.

The valve 206 is also coupled to the housing 210, and includes a valve body 222 that has a fluid inlet 224 and a fluid outlet 226. In the depicted embodiment, the valve body 222 is constructed of two sections, a first section 228 and a second section 230. The valve body first section 228, which includes the fluid inlet 224, extends into the reservoir 202 and is sealingly coupled to the threaded end cap 251 by, for example, threaded fasteners 232 and one or more seals 234. The valve body second section 230, which includes the fluid outlet 226, is sealingly coupled to the valve body first section 228 by, for example, an O-ring, and one or more seals 236. One or more adjustment shims 238 may be placed between the valve body first 228 and second 230 sections. The purpose for the adjustment shims 238 is discussed in more detail further below.

The valve 206 also includes a poppet 240, which is slidably mounted within an inner volume 242 of the valve body 222 and is moveable between a closed position and an open position. In the closed position, which is shown in FIG. 2, a seal element 244, which is coupled to a first end 246 of the poppet 240, fluidly seals the valve body inner volume 242 from the valve body fluid inlet 224. A spring element 248 such as, for example, a coil spring, is disposed between the valve body second section 230 and a second end 250 of the poppet 240 and biases the poppet toward the closed position. One or more flow passages 252 are formed through the poppet 240 and fluidly communicate the valve body fluid outlet 226 with the valve body inner volume 242. In the open position, when the poppet 240 and seal element 244 are moved in a direction that unseals the valve body fluid inlet 224, the valve body fluid inlet 224 and fluid outlet 226 are in fluid communication with one another via the flow passages 252.

Having described the lubrication medium supply system 120 in detail from a structural standpoint, a detailed description of the method whereby it delivers lubricant to the CMG bearing assemblies 106 will now be provided.

When lubricant is to be delivered to the bearing assemblies 106, the controller 122 will supply an appropriate command to the motor 204 which will in turn rotate a commanded number of steps or revolutions in the commanded direction. As the motor 204 rotates, the actuator assembly 220 will in turn translate a predetermined amount in a direction that will compress the bellows 208. The controller 122 can use this translation amount to quantify the amount of lubricant delivered, and to determine the total amount of lubricant delivered, and thus the amount of lubricant remaining. The compression of the bellows 208 will in turn pressurize the lubrication medium 212. When the pressure of the lubrication medium 212 attains a first pressure magnitude that is sufficient to overcome the force of the spring element 248, the valve 206 opens, coupling the fluid inlet 224 and fluid outlet 226 in fluid communication with one another. In particular, when the pressure of the lubrication medium 212 attains the first pressure magnitude, the poppet 240 is moved to the left (as viewed from the perspective of FIG. 2). As the poppet 240 moves left, the pressurized lubricant 212 flows into and through the fluid inlet 224, and into the valve body inner volume 242. The pressurized lubricant 212 in the valve body inner volume 242 flows through the poppet flow passages 252, into and through the fluid outlet 226, and into and through the fluid supply line 124 to the bearing assemblies 106.

As lubrication medium 212 flows from the reservoir 202, through the valve 206, and to the bearing assemblies 106, the pressure of the lubrication medium 212 in the reservoir 202 will decrease. When the lubricant pressure has decreased to a second pressure magnitude, the force of the spring element 248 will move the valve 206 to the closed position. In particular, when the second pressure magnitude is reached, the spring element 248 moves the poppet 240 to the right (as viewed from the perspective of FIG. 2) toward the closed position. In the closed position, the spring element 248 fluidly seals the fluid inlet 224, and no more lubricant flows into and through the valve 206.

It will be appreciated that the first and second pressure magnitudes, at which the valve 206 opens and closes, respectively, is adjustable by adjusting the force supplied to the poppet 240 from the spring element 248. This may be done in any one of numerous ways, in the depicted embodiment, however, the number and/or size of the adjustment shims 238 is varied to adjust the spring force. It will additionally be appreciated that the system 120 may be configured and calibrated to dispense a particular volume of lubricant in response to a particular amount of movement of the actuator assembly 220. For example, in a particular preferred embodiment in which the lubricant is Pennzane® Nye 2001 liquid lubricant, the system is configured and calibrated such that compressing the bellows 208 0.0005-inches will result in 4 milligrams of lubricant being dispensed from the reservoir 202.

Figure 3:
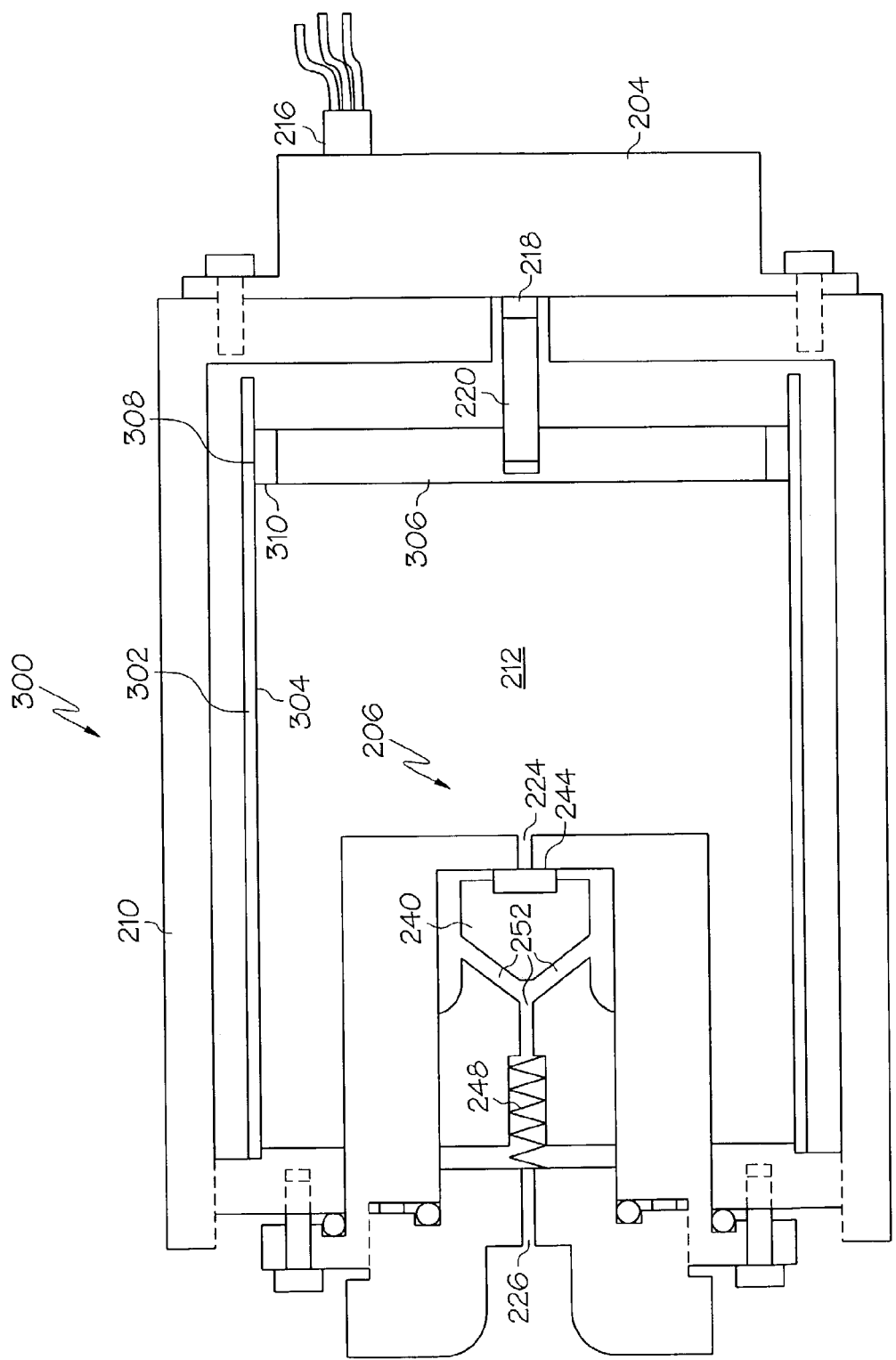
FIG. 3 is a cross section view of a lubrication medium supply system according to an exemplary alternative embodiment of the present invention that may be incorporated into the control moment gyro system shown in FIG. 1.

In an alternative embodiment, the lubrication medium supply system may be implemented with a different type of reservoir. In particular, as shown in FIG. 3, rather than using a flexible bellows 208 as the reservoir, the alternative system 300 uses a substantially solid reservoir 302. The reservoir 302 may be formed in any one of numerous shapes, but in a preferred embodiment it has an inner peripheral surface 304 that is substantially cylindrical in cross section. Moreover, in this alternative embodiment the actuator assembly 220 is coupled to a plunger 306, which is moveable within the reservoir 302. The plunger 306 has an outer peripheral surface 308 that preferably is shaped substantially similar to the cross section of the reservoir inner peripheral surface 304. The plunger outer peripheral surface 308 contacts, in a substantially fluid-tight fashion, the reservoir inner peripheral surface 304. To facilitate this substantially fluid-tight contact, one or more fluid seals 310 may be coupled to, or formed integrally on, the plunger outer peripheral surface 308.

The embodiment depicted in FIG. 3 and described above functions substantially similar to the embodiment depicted in FIG. 2. However, rather than compressing the bellows 208 to pressurize the lubrication medium 212, the plunger 306 is displaced linearly to compress, and thereby pressurize, the lubrication medium 212. Again, the alternate system 300 may be configured and calibrated to dispense a particular volume of lubricant in response to a particular amount of movement of the actuator assembly 220. For example, in a particular preferred embodiment in which the lubricant is Pennzane® Nye 2001 liquid lubricant, the system 300 is configured and calibrated such that displacing the plunger 306 0.0005-inches into the reservoir 302 will result in 4 milligrams of lubricant being dispensed from the reservoir 302.

The lubrication medium supply systems described herein include reservoirs that are not continuously pressurized. Rather, the lubricant in the reservoirs is pressurized momentarily, when lubricant is to be dispensed. Hence, the likelihood of delivering excessive amounts of lubricant to the spin bearings is reduced, and the volume of lubricant that may be stored in the reservoir can be increased. The systems can also reduce fabrication and maintenance complexity, time, and associated costs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A lubrication medium supply system, comprising:
a reservoir having an inner volume adapted to receive a lubrication medium therein;
a motor coupled to the reservoir and operable to selectively compress, and thereby pressurize to at least a first pressure magnitude, the lubrication medium; and
a valve having at least a fluid inlet and a fluid outlet, the fluid inlet in fluid communication with the reservoir inner volume, and the valve operable, in response to the pressurization of the lubrication medium to at least the first pressure magnitude, to couple the fluid inlet and fluid outlet in fluid communication with one another to thereby depressurize the pressurized lubrication medium, whereby lubrication medium flows from the reservoir through the valve body fluid outlet at least until the lubrication medium is depressurized to a second pressure magnitude.

2. The system of claim 1, wherein:
the reservoir comprises a flexible membrane; and
the motor is operable to compress the flexible membrane to thereby pressurize the lubrication medium therein to at least the first pressure magnitude.

3. The system of claim 2, further comprising:
an actuator coupled between the motor and the flexible membrane, the actuator configured to translate linearly in a first and a second direction in response to motor rotation in the first and a second direction, respectively, whereby translation of the actuator in the first direction results in the compression of the flexible membrane.

4. The system of claim 1, wherein the reservoir comprises a substantially hollow cylinder having an inner peripheral surface, and wherein the system further comprises:
an actuator coupled to the motor, the actuator configured to translate linearly in a first and a second direction in response to motor rotation In a first and a second direction, respectively; and
a plunger coupled to the actuator and having an outer peripheral suffice in substantially fluid sealed contact with the reservoir inner peripheral surface, whereby translation of the actuator in the first direction results in the pressurization of the lubrication medium.

5. The system of claim 1, wherein the valve comprises:
a valve body that includes at least the fluid inlet and the fluid outlet; and
a flow control element disposed within the valve body and operable, in response to the pressurization of the lubrication medium, to move between at least a closed position and an open position,
wherein the fluid inlet and fluid outlet are in fluid communication with one another when the flow control element is not in the closed position.

6. The system of claim 5, wherein the valve body includes an inner peripheral surface that forms an inner volume that is in fluid communication with the fluid inlet and fluid outlet, and wherein the flow control element comprises:
a poppet having at least a first end and a second end, the poppet slidably mounted within the valve body inner volume and moveable between at least the closed position and the open position;
one or more fluid flow passages extending through the poppet and in fluid communication with the valve body inner volume; and
a spring coupled between at least a portion of the valve body inner volume and the poppet second end and configured to supply a spring bias that biases the poppet toward the closed position.

7. The system of claim 6, wherein the flow control element further comprises:
a seal element coupled to at least the poppet first end and configured to fluidly seal the valve inlet when the poppet is in the closed position.

8. The system of claim 6, wherein the spring bias is adjustable.

9. The system of claim 6, wherein the valve body includes at least a first section and a second section coupled to one another, and wherein the valve further comprises:
one or more shims disposed between the valve body first and second sections.

10. The system of claim 9, wherein the spring bias is adjustable by varying a number or thickness of the shims.

11. The system of claim 6, wherein:
the poppet includes at least an outer peripheral surface; and
at least a first portion of the poppet outer peripheral surface is in substantially fluid tight sealed contact with at least a portion of the valve body inner peripheral surface.

12. The system of claim 1, wherein the motor comprises a stepper motor.

13. A valve, comprising:
a valve body that includes at least an inner peripheral surface that forms an inner volume, a fluid inlet, and a fluid outlet, the inner volume in fluid communication with the fluid inlet and the fluid outlet, the fluid inlet adapted to couple to a selectively pressurized source of a lubrication medium; and
a flow control element disposed within the valve body and operable, in response to pressurization of the lubrication medium to at least a first pressure magnitude, to move between at least a closed position and an open position, the flow control element comprising:
a poppet having at least a first end and a second end, poppet slidably mounted within the valve body inner volume and moveable between at least the closed position and the open position.
one or more fluid flow passages extending through the poppet and in fluid communication with the valve body inner volume, and a spring coupled between at least a portion of the valve body inner volume and the poppet second end and configured to supply a spring bias that biases the poppet toward the closed position, wherein the fluid inlet and fluid outlet are in fluid communication with one another when the flow control element is not in the closed position.

14. The valve of claim 13, wherein the flow control element further comprises:

a seal element coupled to at least the poppet first end and configured to fluidly seal the valve inlet when the poppet is in the closed position.

15. The valve of claim 13, wherein the spring bias is adjustable.

16. The valve of claim 13, wherein the valve body includes at least a first section and a second section coupled to one another, and wherein the valve further comprises:

one or more shims disposed between the valve body first and second sections.

17. The valve of claim 16, wherein the spring bias is adjustable by varying a number or thickness of the shims.

18. A method of delivering lubricant contained within a reservoir to a bearing assembly, comprising:

providing a valve having a fluid inlet in fluid communication with the lubricant in the reservoir and a fluid outlet in fluid communication with the bearing assembly, and operable, in response to pressurization of the lubricant in the reservoir to at least a first pressure magnitude, to couple the fluid inlet and fluid outlet in fluid communication with one another; and selectively pressurizing the lubricant to at least the first pressure magnitude to thereby couple the fluid inlet and fluid outlet in fluid communication with one another, whereby lubricant flows from the reservoir to the bearing assembly and substantially simultaneously depressurizes the lubricant.

19. The method of claim 18, wherein the fluid inlet and fluid outlet are decoupled from fluid communication with one another in response to the lubricant depressurizing to at least a second pressure magnitude.

20. The method of claim 18, further comprising:
compressing the reservoir to thereby pressurize the lubricant contained therein to at least the first pressure magnitude.

21. The method of claim 18, Thither comprising:
compressing the lubricant contained in the reservoir to thereby pressurize it to at least the first pressure magnitude.

22. The method of claim 18, wherein a predetermined amount of lubricant flows from the reservoir based at least in part on the magnitude to which the lubricant is pressurized.

23. The method of claim 20, further comprising:
determining a volume of lubricant that flows from the reservoir based at least in part on an amount that the reservoir is compressed.

24. A control moment gyro, comprising:

a flywheel;

one or more bearing assemblies rotationally supporting the flywheel;

a reservoir having an inner volume adapted to receive a lubrication medium therein;

a motor coupled to the reservoir and operable to selectively compress, and thereby pressurize to at least a first pressure magnitude, the lubrication medium; and a valve having at least a fluid inlet and a fluid outlet the fluid inlet in fluid communication with the reservoir inner volume and the fluid outlet in fluid communication with one or more of the bearing assemblies, the valve operable, in response to the pressurization of the lubrication medium to at least the first pressure magnitude, to fluidly couple the fluid inlet and fluid outlet in communication with one another to thereby depressurize the pressurized lubrication medium, whereby lubrication medium flows from the reservoir through the valve body fluid outlet at least until the lubrication medium is depressurized to a second pressure magnitude.

* * * * *

UNITED STATES PATENT AND TRADEMARK OFFICE
CERTIFICATE OF CORRECTION

PATENT NO. : 7,152,712 B2  Page 1 of 1
APPLICATION NO. : 10/431794
DATED : December 26, 2006
INVENTOR(S) : Gisler et al.

It is certified that error appears in the above-identified patent and that said Letters Patent is hereby corrected as shown below:

Column 7, line 53, "in the first" should be changed to --in a first--;
Column 7, line 61, "rotation In a" should be changed to --rotation in a--;
Column 7, line 64, "suffice" should be changed to --surface--;
Column 8, line 62, "poppet slidably" should be changed to --the poppet slidably--;
Column 8, line 64, "open position." should be changed to --open position,--;
Column 10, line 5, "Thither " should be changed to --further --;
Column 10, line 26, "fluid outlet the" should be changed to --fluid outlet, the--.

Signed and Sealed this

Fifteenth Day of May, 2007

JON W. DUDAS
*Director of the United States Patent and Trademark Office*